United States Patent [19]

Poindexter et al.

[11] 4,116,766

[45] Sep. 26, 1978

[54] ULTRASONIC DIP SEAL MAINTENANCE SYSTEM

[75] Inventors: Allan M. Poindexter, Pleasant Hills; Herbert E. Ricks, Forest Hills, both of Pa.

[73] Assignee: The United States of America as represented by the Department of Energy, Washington, D.C.

[21] Appl. No.: 719,310

[22] Filed: Aug. 31, 1976

[51] Int. Cl.² .............................................. G21C 9/00
[52] U.S. Cl. ...................................... 176/38; 176/40; 176/87
[58] Field of Search ................. 176/19 R, 19 LD, 40, 176/38, 87, 37; 134/1; 259/DIG. 44

[56] References Cited

U.S. PATENT DOCUMENTS

| 3,572,352 | 3/1971 | Koopman | 134/122 |
|---|---|---|---|
| 3,698,408 | 10/1972 | Jacke | 134/122 |
| 3,753,852 | 8/1973 | Scott et al. | 176/19 R |
| 3,795,358 | 3/1974 | Sarnacki et al. | 134/1 |
| 3,819,478 | 6/1974 | Thorel et al. | 176/87 |
| 3,847,662 | 11/1974 | Massa | 134/1 |

Primary Examiner—Verlin R. Pendegrass
Assistant Examiner—Ralph Palo
Attorney, Agent, or Firm—L. A. DePaul; Z. L. Dermer

[57] ABSTRACT

A system for removing impurities from the surfaces of liquid dip seals and for wetting the metal surfaces of liquid dip seals in nuclear components. The system comprises an ultrasonic transducer that transmits ultrasonic vibrations along an ultrasonic probe to the metal and liquid surfaces of the dip seal thereby loosening and removing those impurities.

14 Claims, 8 Drawing Figures

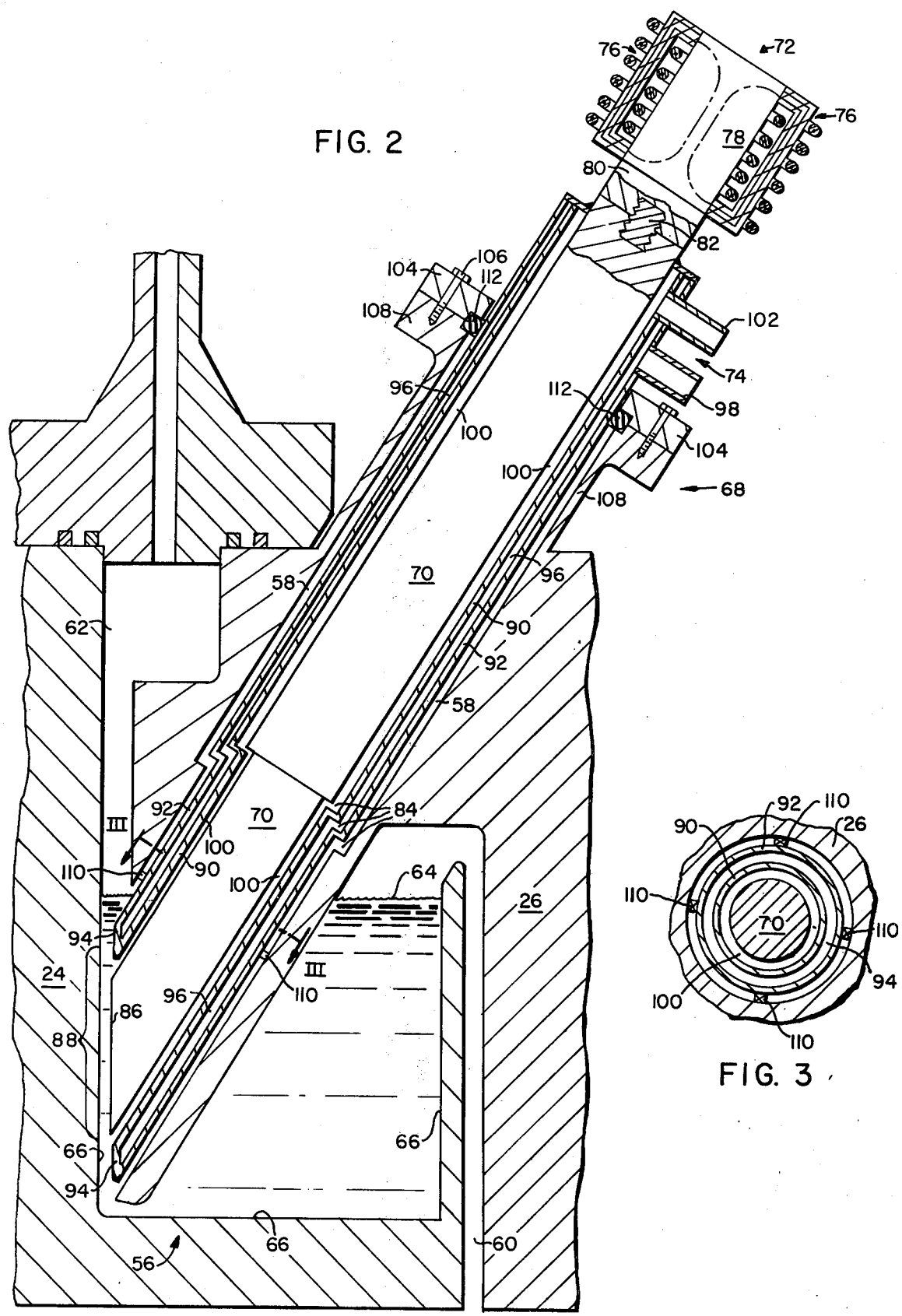

ULTRASONIC DIP SEAL MAINTENANCE SYSTEM

GOVERNMENT CONTRACT

The invention described herein was made in the course of, or under, Contract Number E(11-1)2395 with the United States Energy Research and Development Administration.

CROSS-REFERENCE TO RELATED APPLICATIONS

The invention herein disclosed is related to copending application Ser. No. 719,320, filed Aug. 31, 1976, entitled "Liquid Sodium Dip Seal Maintenance System," by R. L. Briggs and S. A. Meacham which is assigned to the assignee of the present invention.

BACKGROUND OF THE INVENTION

The invention relates to nuclear reactor dip seal maintenance systems and more particularly to liquid sodium dip seal maintenance systems of nuclear reactor components having rotatable members.

In nuclear reactor designs, well known in the art, a reactor vessel with fuel assemblies disposed therein and having an inlet and an outlet for circulation of a coolant in heat transfer relationship with the fuel assemblies is sealed by a closure head located on top of the reactor vessel. In certain designs, the closure head comprises one or more rotatable plugs which may be of varying sizes disposed eccentrically within each other. Moreover, the rotatable plugs may have refueling equipment disposed on them. In these designs, a selected rotation of the rotatable plugs serves to position the refueling machines in appropriate relationship to the fuel assemblies in the reactor vessel to facilitate the refueling process.

Since the rotatable plugs must be able to rotate relative to each other, the plugs are mounted so as to define an annulus between them that may extend from the bottom to the top of the closure head. However, while the annulus provides for the rotation of the plugs, it also establishes a path for the release of radioactive particles that may be present in a cover gas that fills the void between the bottom of the closure head and the top of the reactor coolant pool. Accordingly, seals are provided at various locations across the annuli to prevent this release of radioactive particles. These seals may be of various types located at one or more locations along the annulus. As is well known in the art, a typical annulus seal may be a liquid dip seal. Furthermore, in a liquid metal fast breeder reactor, the liquid used in the dip seal may be sodium. In certain applications, the liquid sodium dip seal may be placed at such a location or with heating elements surrounding it so that the sodium remains in a liquid state during reactor operation. In other applications, the sodium in the dip seal is allowed to solidify during reactor operation, thereby increasing the effectiveness of the seal. However, in any application the sodium must be a liquid during reactor refueling to enable the plugs to rotate.

During reactor operation, the cover gas which may be an inert gas such as argon becomes contaminated with not only radioactive particles but also oxides and hydrides of sodium. Because the sodium in the dip seal is in contact with the cover gas and gas above the seal, the sodium in the dip seal also becomes contaminated with these compounds and other impurities. These impurities may cause a crust to form on the sodium dip seal free liquid surface and may be deposited on the metal surfaces bonding the liquid sodium. In addition, the amount of liquid sodium within the dip seal is reduced due to the formation of these impurities. These impurities may continue to develop to the extent of resisting rotation of the plugs or even to the extent of preventing this rotation. Therefore, it is necessary to periodically remove the impurities from the dip seals. Several methods and mechanisms are known for removing these kinds of impurities from components but they have not been effective when used in reactor operations.

One method for removing impurities from sodium which is well known in the art involves the application of steam to the deposits. The steam causes a chemical reaction which causes the impurities to recombine and be forced out of the dip seal. There is, however, a major problem with this method. This problem is that liquid sodium reacts violently in contact with steam or oxygen. To reduce this reaction, the steam is mixed with an inert gas such as argon in such a percentage as to limit this violent reaction. Nevertheless, the use of steam creates the same kind of problems that it seeks to eliminate because the steam itself adds impurities that may combine with sodium elsewhere in the reactor system such as the reactor coolant area or other annuli thereby creating a similar problem at a different location. Therefore, while the steam method may temporarily clean the dip seals, the problem may recur at another location.

The most common method for removal of the crust associated with these impurities is by a contact tool such as a scraper. In this method, a scraper is placed in contact with the crust while the plugs are rotated thereby scraping the crust loose and preventing its accumulation to the extent of preventing rotation of the plugs. However, in this method, the scraping action may accumulate the crusty impurities between the scraper and plug annuli surfaces so as to clog the annuli and prevent further rotation of the plugs. Of course, this difficulty prevents this method from being a satisfactory method of removing these impurities.

In U.S. Pat. No. 3,819,478, to Thorel et al, issued June 25, 1974, there is described an apparatus that attempts to provide a pair of properly located redundant dip seals in a top shield plug annulus that prevents liquid sodium vapors or cover gas from entering the annulus below the top frozen dip seal in a rotating plug. The Thorel patent also attempts to describe a means of removing impurities from sodium before the sodium is introduced into the dip seals. While the Thorel patent may describe one method of removing impurities from sodium outside of a dip seal it does not teach a method of removing impurities that may contaminate the sodium in a dip seal that is not easily accessible.

While the prior art contains several methods for cleaning sodium deposits on reactor components and for removing impurities from sodium, it does not teach an effective method or effective non-contacting tool for removing impurities from relatively inaccessible reactor components, such as liquid sodium dip seals. In addition to the problem of impurities in the liquid of the dip seal forming a crust that hampers rotation, the contaminated cover gas also causes a problem by migrating through small gaps between the liquid sodium in the dip seals and the metal surfaces of the dip seals thereby contaminating the atmosphere beyond the dip seals.

Normal machining of components for nuclear reactors, while being extremely precise, nevertheless, leave minute ridges on the machined surfaces. The manufacture of rotatable closure head plugs along with the metal surfaces that comprise the dip seals, likewise, leaves ridges on the surfaces of the metal that comprise the dip seals. With liquid sodium in the dip seals, the metal surfaces below the liquid level of the dip seal appear to come in contact with the liquid sodium. This contact between the metal surfaces and the liquid sodium is normally thought to form a barrier against the escape of contaminated cover gas past the dip seal. However, tests have shown that while the liquid sodium in the dip seals does contact the crest of the ridges in the machined metal, surface tension effects well known to those skilled in the art prevent the liquid sodium from completely filling all of the grooves formed by the machined ridges in the metal surfaces. The result of this less than total filling of grooves is that minute amounts of radioactive particles contained in the contaminated cover gas trace a somewhat tortuous leak path through these grooves and escape past the liquid dip seal thereby contaminating the atmosphere beyond the dip seal. In order to eliminate these leak paths and thus significantly reduce radioactive leakage past the dip seals, it is necessary that these grooves become totally filled with liquid sodium. A surface that has these types of grooves filled with a liquid is referred to in the art as a wetted surface.

There are many methods known in the art for reducing surface tension effects so that a metal surface may become wetted with a liquid. One such method is to coat the machined surface with another metal such as gold so that when the coated surface comes into contact with the liquid, the liquid causes the metal coating to dissolve in the liquid while wetting the metal surface. While this method and others related to it may be effective in an application wherein the metal surfaces are small and easily accessible, it is not feasible for use in applications where the metal surfaces are large and inaccessible such as in liquid dip seals of nuclear reactor components. Moreover, in nuclear reactor components wherein the contaminated cover gas causes impurities to form in the dip seal, the impurities can accumulate in the grooves so as to cause a once wetted surface to become non-wetted. Therefore, it is necessary to rewet the metal surfaces after the reactor has been operating for a period of time. It is this rewetting that necessitates an apparatus capable of wetting the metal surfaces of the dip seals while the metal surfaces remain in a location where accessibility is limited.

There are, therefore, at least two problems associated with the contamination of the liquid sodium in the dip seals, one being the formation of a crust in the dip seal and the other being the leakage of radioactive particles through minute grooves in the metal surfaces of the dip seal. Although there are several methods known in the art for rectifying these problems, those methods are not effective where accessibility to the problem area is limited such as in components of nuclear reactors.

SUMMARY OF THE INVENTION

A system for removing impurities from the surface of liquid dip seals and for wetting the metal surfaces of liquid dip seals in nuclear components comprises an ultrasonic transducer that transmits ultrasonic vibrations along an ultrasonic probe to the metal and liquid surfaces of the dip seal. The ultrasonic vibrations cause impurities to be removed from the metal surfaces which reduces the surface tension effects associated with the liquid-metal interface thereby allowing the liquid of the dip seal to fill minute grooves in the metal surface which prevents leakage of radioactive particles through those grooves. The ultrasonic vibrations also cause impurities that may form a crust on the liquid surface to become dissolved. In addition, a shroud disposed around the ultrasonic probe in conjunction with a suction apparatus provides a mechanism whereby the impurities may be removed from the dip seal area.

It is an object of this invention to provide a system for transmitting ultrasonic vibrations to metal surfaces of liquid metal dip seals of nuclear components in order to remove impurities associated with those surfaces.

It is another object of this invention to provide a system for transmitting ultrasonic vibrations to liquid surfaces of liquid metal dip seals in order to remove impurities associated with those surfaces.

It is a more particular object of this invention to provide a system for transmitting ultrasonic vibrations to surfaces of liquid metal dip seals of nuclear components in order to remove impurities from those surfaces and remove those impurities from the component.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

FIG. 2 is a cross-sectional view in elevation of the ultrasonic dip seal maintenance apparatus disposed on a rotatable closure head plug of a nuclear reactor;

FIG. 3 is a cross-sectional view through line III—III of FIG. 2;

DESCRIPTION OF THE PREFERRED EMBODIMENT

In designs of nuclear reactors, the reactor vessel is closed at its top end by a closure head. In some designs, this closure head comprises several rotatable plugs which may be of varying sizes disposed eccentrically with respect to each other that support refueling apparatus. The rotation of these plugs position the refueling apparatus in appropriate relationship with the core in order to refuel the reactor. The plugs may be supported so as to define an annulus between them thereby enabling their relative rotation. In order to prevent a contaminated cover gas which fills the space between the top of the reactor coolant level and the bottom of the plugs from escaping from the reactor vessel, a liquid sodium dip seal is placed in the annulus. Occasionally, impurities that have developed in the dip seals must be removed in order to promote plug rotation and to assure that the dip seal provides an effective mechanism for sealing the annuli. The invention, herein described, provides a means for removing these impurities.

Figure 1:
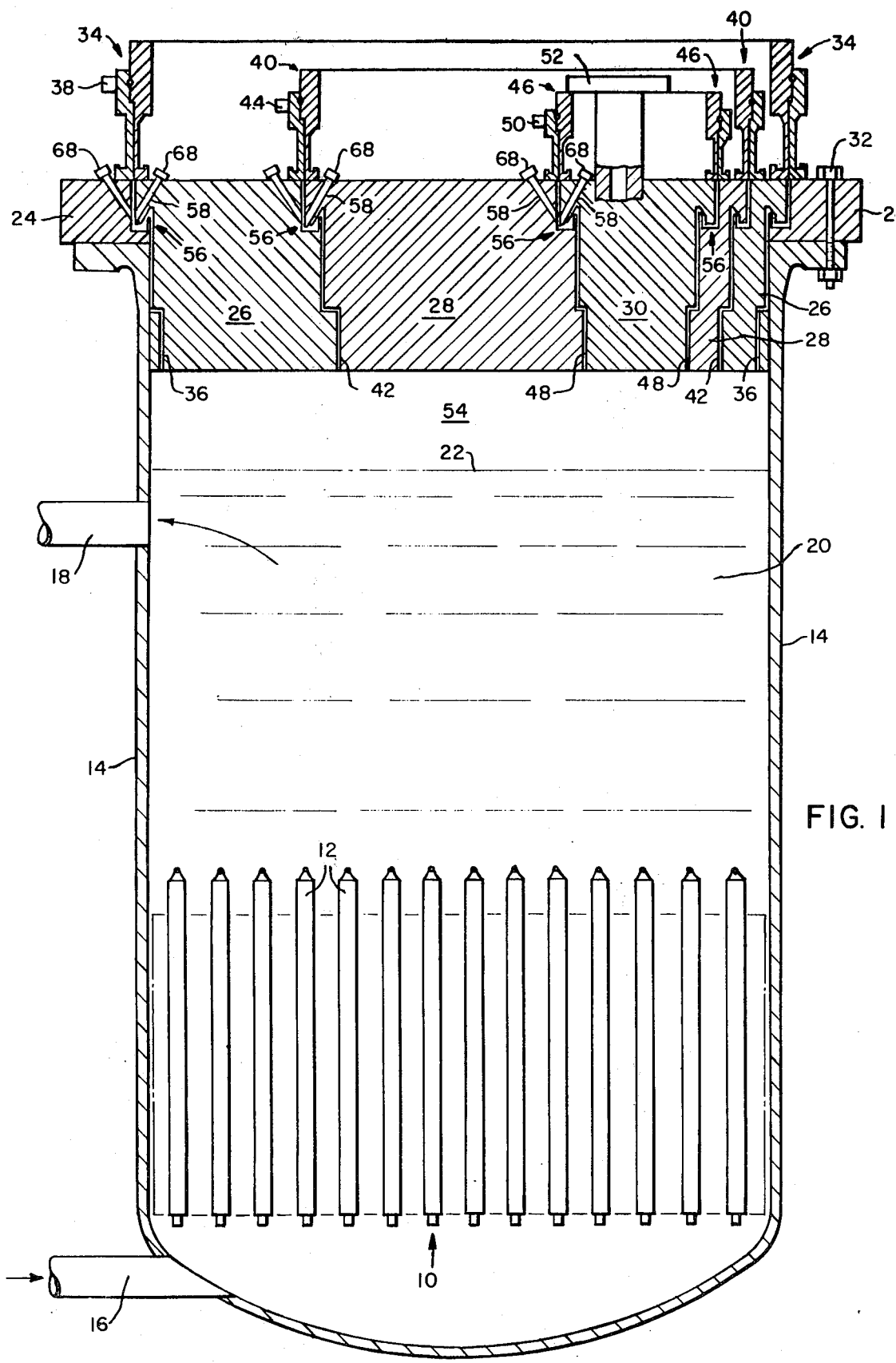
FIG. 1 is a cross-sectional view in elevation of a nuclear reactor having rotatable closure head plugs.

Referring to FIG. 1, a core 10 comprising fuel assemblies 12 that produce heat is contained within a reactor vessel 14. The reactor vessel 14 has an inlet 16 and an outlet 18 that permits a coolant 20 to circulate in a heat transfer relationship with the fuel assemblies 12. The coolant 20, which in a fast breeder reactor may be liquid sodium, fills the reactor vessel 14 to a coolant level 22. The reactor vessel 14 is closed at its top end by a closure head comprising a stationary outer ring 24, a large rotatable plug 26, an intermediate rotatable plug 28, and a small rotatable plug 30. The stationary outer ring 24 may be attached to the reactor vessel by bolts 32 or other suitable means known in the art. The large rotatable plug 26 is supported from the stationary outer ring 24 by large riser assembly 34. The outer edge of large rotatable plug 26 together with the inner edge of stationary outer ring 24 define an annulus 36 therebetween. The large riser assembly 34 which contains bearings and seals (not shown) is driven by a plug drive mechanism 38 that enables the large rotatable plug 26 to move relative to stationary outer ring 24 while maintaining a fluid tight boundary between the outside and inside of reactor vessel 14. In addition, the large riser assembly 34 locates the bearings, seals, and drive mechanism away from the hot surface of the large rotatable plug 26 thus providing a cooler operating environment and thus allowing a greater range of selectivity of bearing, seal, and drive mechanism materials.

Again referring to FIG. 1, intermediate rotatable plug 28 is disposed eccentrically within large rotatable plug 26, supported by intermediate riser assembly 40 defining an annulus 42 therebetween, and is driven by plug drive mechanism 44 in a manner similar to that of the large riser assembly 34. Likewise, the small rotatable plug 30 is similarly eccentrically disposed within intermediate rotatable plug 28, supported by small riser assembly 46 defining an annulus 48 therebetween, and driven by plug drive mechanism 50. In addition, small rotatable plug 30 has disposed therein an in-vessel transfer collar 52 which provides access for an in-vessel transfer machine (not shown).

When the reactor coolant 20 is liquid sodium as in the case of liquid metal fast breeder reactors, it is necessary to avoid contact of the liquid sodium by oxygen because such contact will result in a violent reaction. To thus avoid this reaction, the space between the bottom of the closure head and the coolant level 22 is filled with a cover gas 54 which may be an inert gas such as argon. The cover gas 54 not only fills the cover gas space but it also fills the annuli (36, 42, 48). While the cover gas 54 prevents oxygen from contacting the coolant 20, the cover gas 54, itself, becomes contaminated with radioactive gaseous fission products and is also subjected to radiation exposure from the core and thus becomes contaminated with radioactive particles. It, therefore, becomes necessary to prevent the contaminated cover gas 54 from escaping up the annuli (36, 42, 48), through the seals in the upper risers, and out of the reactor. To insure against this release, at least one liquid dip seal which may be liquid sodium is placed in each of the annuli in a manner well known to those skilled in the art. A typical dip seal 56 along with typical dip seal maintenance ports 58 are shown on the large rotatable plug 26.

Referring now to FIG. 2, a typical annulus, such as annulus 36, is divided into two portions, lower annulus 60 and upper annulus 62 by dip seal 56 in a manner well known in the art. Cover gas 54 which may be contaminated with radioactive particles fills lower annulus 60 up to dip seal level 64 which is the free surface of the liquid sodium on the lower annulus 60 side of dip seal 56. The purpose of dip seal 56 is to prevent cover gas 54 or the radioactive particles present with it from migrating beyond dip seal level 64. However, the metal surfaces of dip seal 56 that define the dip seal, such as interfaces 66, normally have a tightly adhering layer of oxides or other contaminants thereon that prevents the liquid sodium in dip seal 56 from completely filling the minute machining grooves on the metal surfaces of dip seal 56. The result of this non-wetting is that small amounts of radioactive particles in cover gas 54 trace a tortuous path from lower annulus 60 along interfaces 66 into upper annulus 62 from where they may escape contaminating the atmosphere outside the riser assemblies. These impurities along with impurities in the gas in the upper annulus 62 may also form a crust on the free surface of dip seal 56 thereby hampering rotation of the rotatable plug.

Still referring to FIG. 2, the ultrasonic dip seal maintenance apparatus referred to generally as 68 is shown disposed in dip seal maintenance port 58 of large rotatable plug 26. Ultrasonic dip seal maintenance apparatus 68 comprises extension probe 70, ultrasonic transducer 72 and jacket 74. Ultrasonic transducer 72 may consist of a typical laminated electromagnet 76 disposed about transducer core 78 which may be constructed of a magnetostrictive material such as nickel. Electromagnet 76 produces, in transducer core 78, a magnetic field with lines of force parallel to the longitudinal axis of extension probe 70. Under the application of an alternating current driving force to electromagnet 76, the alternating magnetic field in transducer core 78 causes transducer core 78 to contract and expand so as to set up a longitudinal vibration therein as is well understood in the art. Ultrasonic transducer 72 is brazed by commonly known techniques to coupling probe 80 which may be manufactured of a material such as monel. Extension probe 70 and coupling probe 80 each having screw threads therein are joined together by screw fitting 82. Extension probe 70 is a cylindrical rod that extends from coupling probe 80 located above the reactor closure head down to the vicinity of dip seal 56. Extension probe 70 is constructed so that its upper portion has a diameter greater than its lower portion so that together with corresponding variations in diameter of dip seal maintenance port 58 and jacket 74 they define neutron streaming steps 84. Neutron streaming steps 84 prevent radiation from streaming along a straight line path from dip seal 56 to the outer portions of ultrasonic dip seal maintenance apparatus 68 thereby greatly reducing the energy level of escaping radiation. Extension probe 70 has a lower end 86 shaped to conform to the shape of the zone 88 which is the particular interface 66 selected to be cleaned. In FIG. 2, zone 88 is the interface 66 defined by the metal surface of stationary outer ring 24 and the liquid sodium of dip seal 56.

Furthermore, the ultrasonic transducer 72 may be adjusted by methods well known in the art such as adjusting the alternating current frequency to produce a wavelength which is an integer fraction of the wavelength of coupling probe 80 and extension probe 70 that creates a standing longitudinal wave in ultrasonic dip seal maintenance apparatus 68. For example, the wavelength of many stainless steels such as 304 stainless steel is approximately 10 inches with a driving frequency of approximately 20,000 Hz. The resonance of the standing wave produces nodes at regular locations along extension probe 70 and coupling probe 80 which have no longitudinal movement and produces antinodes at other regular intervals that have maximum longitudinal movement. As is well understood in the art, the precise location of the nodes and antinodes depends on the particular resonant frequency and length of the probes. In addition, it should be noted that while the maximum displacement occurs at the antinodes and no displacement at the nodes, that the maximum stress occurs at the nodes and the minimum stress at the antinodes. Therefore, the location of screw fitting 82 is chosen such that it corresponds to an antinode which thereby limits the stress on such a connection. Likewise, the length of extension probe 70 is chosen such that lower end 86 is located at an antinode in order to produce maximum vibratory motion at lower end 86 near zone 88.

Again referring to FIG. 2, jacket 874 which surrounds extension probe 70 is a double walled stainless steel jacket with an inner wall 90 and an outer wall 92. Inner wall 90 and outer wall 92 are joined near lower end 86 by a closure 94 which is an annular piece of stainless steel. The upper ends of inner wall 90 and outer wall 92 may be likewise joined. Inner wall 90 and outer wall 92 together with the end closure define therebetween an annular gas space 96 which may be filled with a gas such as argon. Gas space 96 along with the gas therein acts to isolate the vibratory motion of extension probe 70 to thereby limit the amount of vibratory energy dissipated in directions other than in the direction of the zone to be cleaned and wetted such as zone 88. A gas nozzle 98 is connected to gas space 96 near the top thereof so that the supply of gas to gas space 96 may be replenished. Inner wall 90 and extension probe 70 define therebetween an annular fluid space 100 that extends from near lower end 86 up to near fluid nozzle 102 which is attached thereto and in fluid communication therewith. Fluid space 100 serves as a passageway whereby loosened impurities in dip seal 56 may be sucked therethrough and out of fluid nozzle 102 by a suction pump (not shown) attached to nozzle 102. Outer wall 92 is welded to a circular metal member 104 having holes therein for accommodating studs 106. Circular metal member 104 is attached by means of studs 106 to port nozzle 108 which arrangement serves to support ultrasonic dip seal maintenance apparatus 68 in dip seal maintenance port 58 while guide pins 110 attached to outer wall 92 aligns ultrasonic dip seal maintenance apparatus 68 in dip seal maintenance port 58. Guide pins 110 which may be manufactured of metal such as stainless steel are welded to outer wall 92 at a location along outer wall 92 corresponding to a node of the longitudinal wave so that there is little relative motion between guide pins 110 and the surface of large rotatable plug 26 in dip seal maintenance port 58. Likewise, seals 112 which may be chosen from those well known in the art such as conoseals or elastomer O-rings are disposed between circular metal members 104 and port nozzle 108 at a point corresponding to a node of the standing wave so that there again is little relative motion between outer wall 92 and seals 112 thereby increasing the effectiveness of seals 112 for sealing dip seal maintenance port 58 from the atmosphere above large rotatable plug 26.

Figure 8:
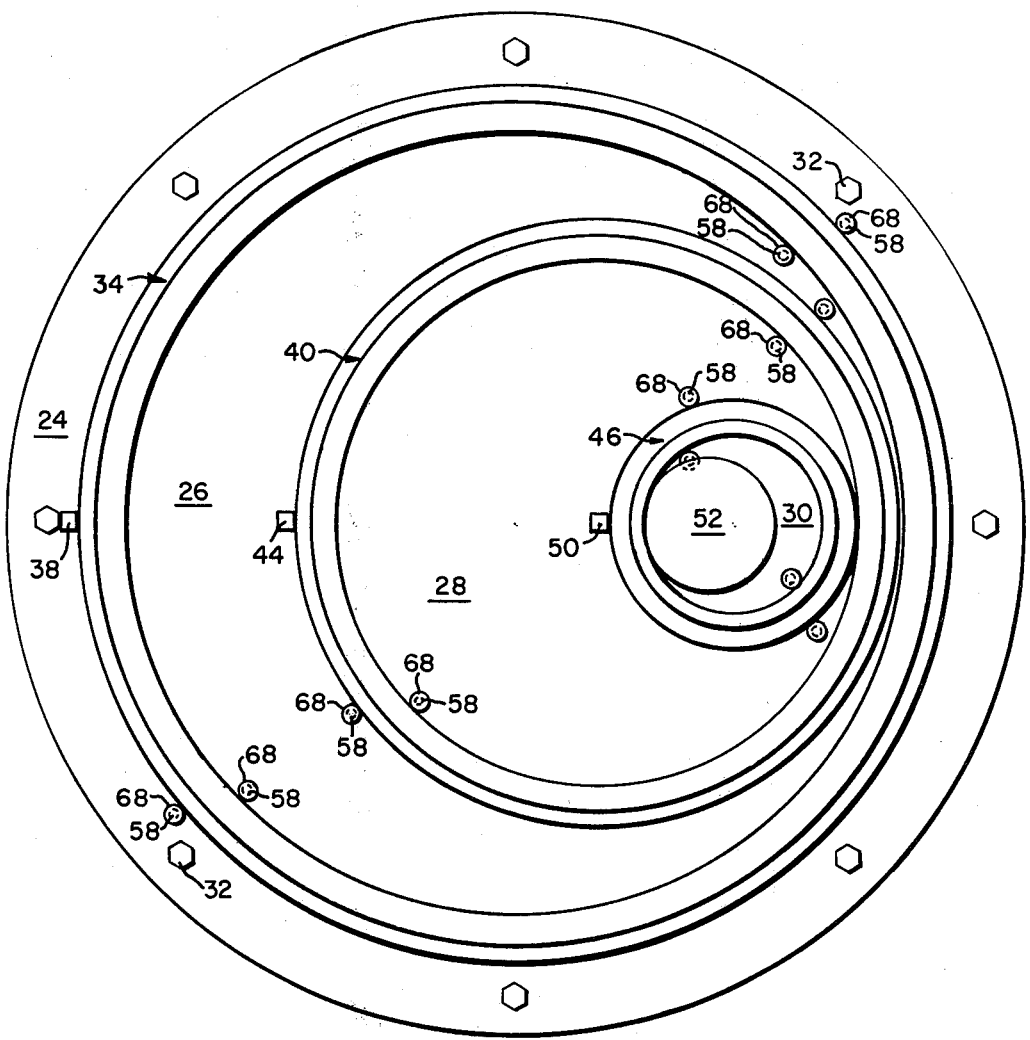
FIG. 8 is a plan view of the nuclear reactor shown in FIG. 1.

In addition, dip seal maintenance ports 58 are provided as shown in FIGS. 1 and 8 that allow ultrasonic dip seal maintenance apparatus 68 to be positioned at a various angles to facilitate the cleaning and wetting of the other interfaces 66 such as the one defined by upper annulus 62 and large rotatable plug 26.

OPERATION

After a period of reactor operation, impurities may develop in dip seal 56 along interfaces 66 and on the surface of the liquid in the dip seal. Ultrasonic dip seal maintenance apparatus 68 is used to both remove these impurities and to allow wetting of the metal surface that will reduce the available leak path. When activated, electromagnet 76 causes transducer core 78 to expand and contract at the resonant frequency of the extension probe 70 and coupling probe 80 combination such as between about 10,000 to about 40,000 Hz, which establishes a longitudinal standing wave therein. Lower end 86 being located at an antinode of the combination has a maximum longitudinal displacement. Due to the close proximity of lower end 86 to zone 88 the vibrational energy of lower end 86 is transmitted through the liquid sodium of dip seal 56 to interface 66 of zone 88. The intensity of the ultrasonic vibrations can be varied by incorporating tuning parameters and acoustic intensity readout devices well known to those skilled in the art. In this manner the power density of the ultrasonic energy can be increased up to cavitation or cold boiling. This ultrasonic vibration causes the impurities to be loosened from the metal surfaces thereby allowing the liquid sodium to fill the minute grooves in the surfaces thus wetting the surfaces thereby blocking the leak paths associated with the liquid-metal interfaces 66. While this process is occurring, the rotatable plugs on which the ultrasonic dip seal maintenance apparatuses 68 are mounted are slowly rotated causing a band of metal along interface 66 to be wetted all along the circumference of the dip seal. In addition, the vibrations combined with the stirring action of lower end 86 in dip seal 56 cause the impurities that form a crust on the dip seal surface to become loosened so that a suction pump connected to nozzle 102 may draw the loosened impurities through annular fluid space 100, out nozzle 102, and into a disposal system chosen from those well known in the art. Furthermore, additional ultrasonic dip seal maintenance apparatuses 68 may be provided in additional dip seal maintenance ports 58 either sequentially or concurrently with those described above and at angles differing from those described above such that all interfaces 66 of dip seal 56 may likewise be wetted. Of course, this process may be performed on all of the dip seals of the rotatable plugs with one or more ultrasonic dip seal maintenance apparatuses 68 either sequentially or concurrently.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. One such modification and variation is shown in FIG. 4.

Figures 4, 5:
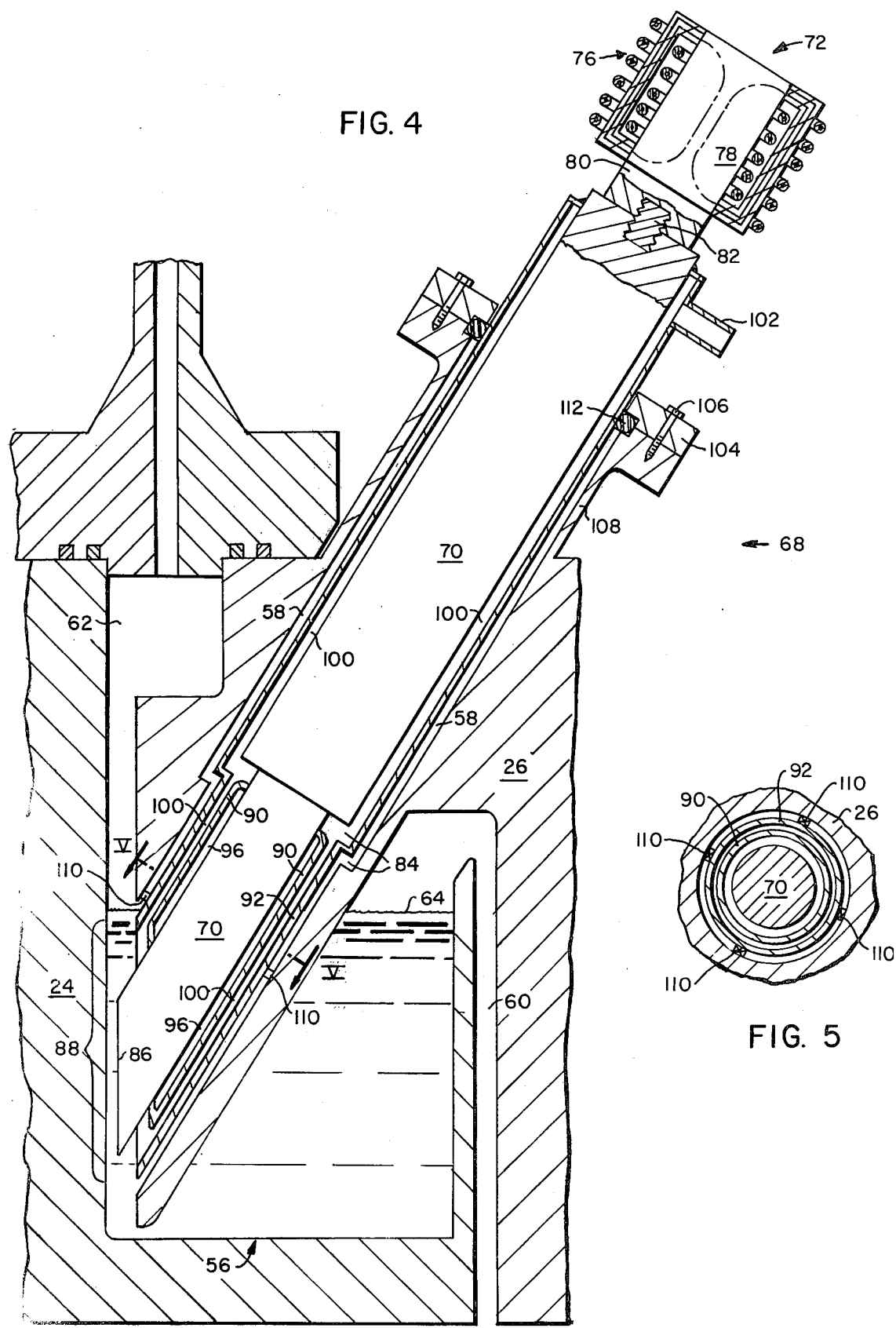
FIG. 4 is a cross-sectional view in elevation of a second embodiment of the ultrasonic dip seal maintenance apparatus.
FIG. 5 is a cross-sectional view through line V—V of FIG. 4.

Referring now to FIG. 4, as an alternative inner wall 90 may be attached to extension probe 70 below neutron streaming step 84 such that gas space 96 is defined between extension probe 70 and inner wall 90. Furthermore, annular fluid space 100 is then defined along its lower portion by inner wall 90 and outer wall 92 and along its upper portion by outer wall 92 and extension probe 70. In this embodiment gas space 96 is totally enclosed and not attached to a gas supply line. Nevertheless, gas space 96 acts to insulate the lower end of extension probe 70 so that the vibratory motion of the lower end of extension probe 70 is not attenuated. A further modification and variation is shown in FIG. 6.

Figures 6, 7:
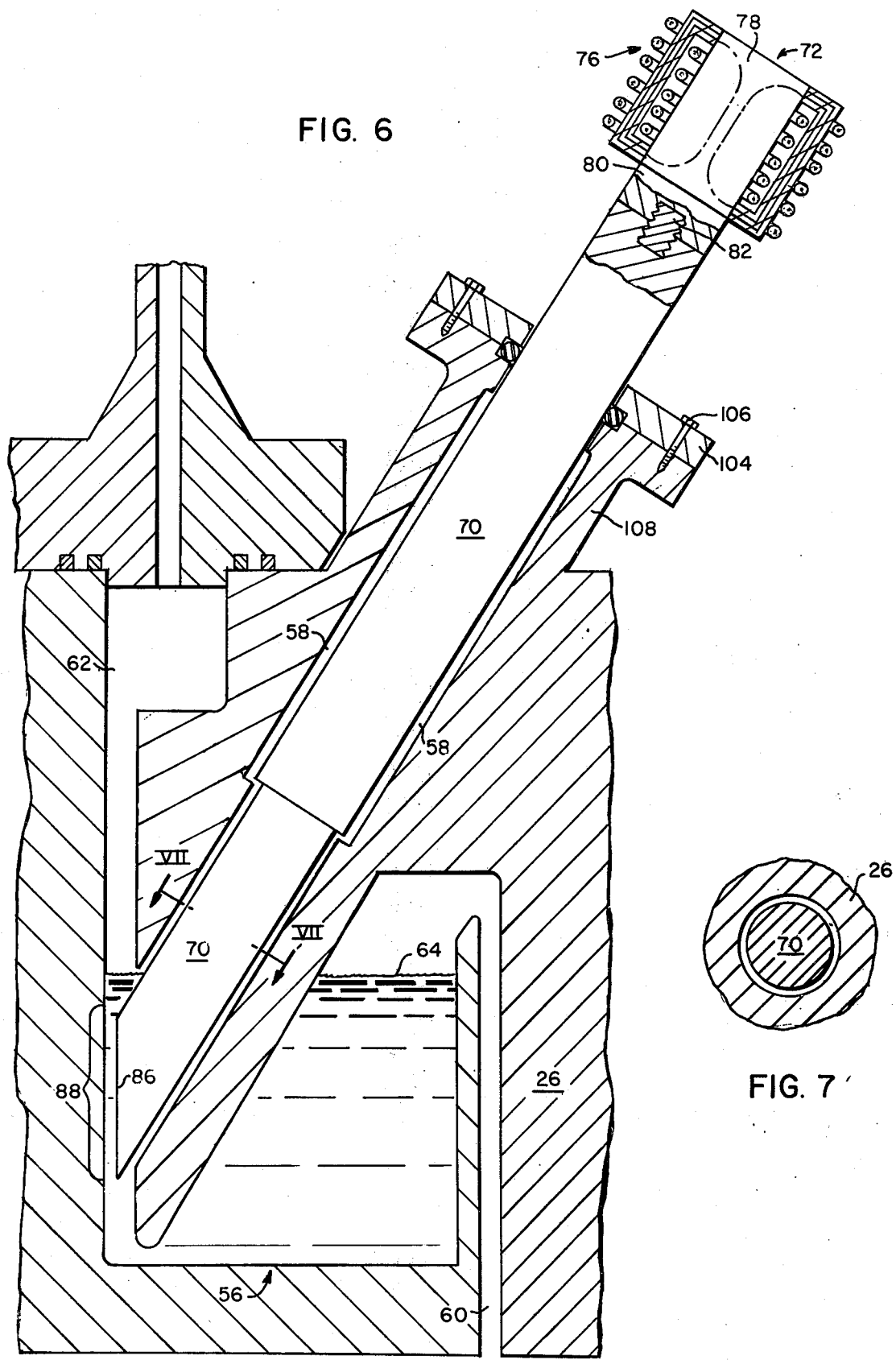
FIG. 6 is a cross-sectional view in elevation of a third embodiment of the ultrasonic dip seal maintenance apparatus.
FIG. 7 is a cross-sectional view through line VII—VII of FIG. 6.

FIG. 6 illustrates a simple embodiment of the invention. In this embodiment the suction apparatus and jacket 74 are deleted. Although this embodiment does not provide for the removal of impurities from the general area of the dip seal 56, it still performs the basic functions of wetting the dip seal metal surfaces and dissolving the crust formed on the dip seal surface. Furthermore, ultrasonic transducer 72 may be of the piezoelectric type.

We claim:

1. A system for maintaining operability of dip seals located in a vessel designed to contain radioactive material comprising:
    a closure head disposed on said vessel having at least one rotatable plug; said rotatable plug having an annulus therearound for enabling rotation of said rotatable plug;
    liquid dip seals disposed in said annulus for preventing the release of said radioactive material;
    an extension probe mounted on said rotatable plug and extending from a first end located above said rotatable plug to a second end located near said dip seal; and
    an ultrasonic transducer attached to said first end of said extension probe for producing vibrations in said extension probe that propagate from said first end to said second end for removing impurities from the metal surfaces of said dip seal and for wetting said metal surfaces thereby increasing the sealing capability of said liquid dip seal and promoting the rotatability of said rotatable plug.

2. The system recited in claim 1 wherein said extension probe comprises:
    a substantially cylindrical body with a first portion of said body having a diameter different from a second portion of said body thereby forming a step for preventing the streaming of neutrons from said dip seal.

3. The system recited in claim 2 wherein said extension probe further comprises:
    a circular metal member attached to said cylindrical body near said first end for supporting said cylindrical body from said rotatable plug.

4. The system recited in claim 3 wherein said extension probe further comprises:
    attachment means located near said first end for attaching said ultrasonic transducer to said first end.

5. The system recited in claim 4 wherein said attachment means comprises:
    a threaded member capable of being screwed into said first end and into said ultrasonic transducer for attaching said ultrasonic transducer to said extension probe.

6. The system recited in claim 1 wherein said ultrasonic transducer comprises:
    a central magnetostrictive core aligned with the longitudinal axis of said extension probe; and
    vibration means disposed about said core for producing ultrasonic vibrations in said core, said core transmitting said ultrasonic vibrations to said extension probe.

7. The system recited in claim 1 wherein said system further comprises:
    suction means associated with said extension probe for removing said loosened impurities from said dip seal.

8. The system recited in claim 7 wherein said suction means comprises:
    a suction pump attached near said first end of said extension probe for suctioning said impurities from said dip seal.

9. The system recited in claim 1 wherein said system further comprises:
    jacket means disposed about said extension probe for isolating said extension probe from said rotatable plug.

10. The system recited in claim 9 wherein said jacket means comprises:
    a first cylindrical wall surrounding said extension probe and defining an annular passageway therebetween.

11. The system recited in claim 10 wherein said system further comprises:
    suction means associated with said extension probe for removing said loosened impurities from said dip seal.

12. The system recited in claim 11 wherein said suction means comprises:
    a suction pump attached near said first end of said extension probe for suctioning said impurities from said dip seal through said annular passageway thereby removing said impurities from said vessel.

13. The system recited in claim 12 wherein said jacket means further comprises:
    a second cylindrical wall attached to said second end of said extension probe defining a gas space therebetween; and
    a gas disposed in said gas space for isolating said extension probe from the suroundings thereby lessening the loss of said ultrasonic vibrational energy through said jacket.

14. The system recited in claim 12 wherein said jacket means further comprises:
    a second cylindrical wall disposed around said first cylindrical wall and sealed at both ends thereof thereby defining a gas space therebetween; and
    a gas disposed in said gas space for isolating said extension probe from the surroundings thereby lessening the loss of said ultrasonic vibrational energy through said jacket.

* * * * *